US007718158B2

(12) United States Patent
Le-Khac et al.

(10) Patent No.: US 7,718,158 B2
(45) **Date of Patent: *May 18, 2010**

(54) POLYMER-ENCAPSULATED ION-EXCHANGE RESIN

(75) Inventors: Bi Le-Khac, West Chester, PA (US); Roger A. Grey, West Chester, PA (US)

(73) Assignee: Lyondell Chemical Technology, L.P., Greenville, DE (US)

( * ) Notice: Subject to any disclaimer, the term of this patent is extended or adjusted under 35 U.S.C. 154(b) by 1202 days.

This patent is subject to a terminal disclaimer.

(21) Appl. No.: 11/249,241

(22) Filed: Oct. 13, 2005

(65) Prior Publication Data

US 2007/0086940 A1 Apr. 19, 2007

(51) Int. Cl.
*C01B 15/029* (2006.01)
*B01J 31/10* (2006.01)

(52) U.S. Cl. ......................... 423/584; 502/159; 521/25; 521/38

(58) Field of Classification Search ................. 423/584; 502/159, 339, 168, 325, 326, 337, 338, 344, 502/347; 428/402, 407; 521/25, 38
See application file for complete search history.

(56) References Cited

U.S. PATENT DOCUMENTS

| | | | | |
|---|---|---|---|---|
| 3,256,250 | A | 6/1966 | Frilette | 260/79.3 |
| 3,472,675 | A * | 10/1969 | Himmel et al. | 428/131 |
| 3,954,666 | A | 5/1976 | Marquisee et al. | 252/430 |
| 4,007,256 | A | 2/1977 | Kim et al. | 423/584 |
| 4,352,945 | A | 10/1982 | Bezman | 568/899 |
| 4,428,283 | A | 1/1984 | Rudolph et al. | 101/35 |
| 4,428,923 | A | 1/1984 | Kunkel et al. | 523/588 |
| 4,731,490 | A | 3/1988 | Coughenour et al. | 568/697 |
| 4,784,879 | A * | 11/1988 | Lee et al. | 427/213.34 |
| 5,017,654 | A * | 5/1991 | Togashi et al. | 525/100 |
| 5,728,785 | A | 3/1998 | Grubbs et al. | 526/142 |
| 5,763,677 | A | 6/1998 | Bryant et al. | 568/454 |
| 5,846,898 | A | 12/1998 | Chuang et al. | 502/181 |
| 5,961,948 | A | 10/1999 | Wanngard | 423/584 |
| 6,156,245 | A | 12/2000 | Takebayashi et al. | 264/4.7 |
| 6,168,775 | B1 | 1/2001 | Zhou et al. | 423/584 |
| 6,284,213 | B1 | 9/2001 | Paparatto et al. | 423/403 |
| 6,375,920 | B2 | 4/2002 | Fischer et al. | 423/584 |
| 6,524,547 | B1 | 2/2003 | Nystrom et al. | 423/588 |
| 6,649,140 | B2 | 11/2003 | Paparatto et al. | 423/584 |
| 6,908,876 | B2 | 6/2005 | Atiqullah et al. | 502/120 |
| 6,951,831 | B2 | 10/2005 | Lecocq et al. | 502/162 |
| 6,958,405 | B2 | 10/2005 | Le-Khac et al. | 549/531 |
| 2003/0100443 | A1 * | 5/2003 | Bender et al. | 502/159 |
| 2003/0215383 | A1 * | 11/2003 | Escrig et al. | 423/584 |
| 2004/0184983 | A1 * | 9/2004 | Paparatto et al. | 423/584 |

FOREIGN PATENT DOCUMENTS

| | | |
|---|---|---|
| EP | 0 498 166 | 8/1992 |
| EP | 1344747 A1 | 9/2003 |
| EP | 1 469 006 | 10/2004 |
| WO | WO 2005/014168 | 2/2005 |
| WO | WO2005/092787 | 10/2005 |

OTHER PUBLICATIONS

S. Kobayashi et al., *Chem. Commun.* (2003) 449.
R. Akiyama et al., *Angew. Chem. Int. Ed. 40* (2001) 3469.
S. Kobayashi et al., *J. Am. Chem. Soc. 120* (1998) 2985.
F. Helfferich, *Ion Exchange*, Chapter 3, (1962) pp. 26-71.
A. Albright, "Basic Principles of Catalysis by Functionalized Porous Organic Polymers" in *Catalyst Supports and Supported Catalyst*, A. Stiles Ed., (1987) pp. 159-186.
M. Donbrow, Ed., "Microcapsules and Nanoparticles" in *Medicine and Pharmacy*, pp. 1-14, 1991.
G. Beestman, "Microencapsulation of Solid Particles" in *Controlled-Release Delivery Systems for Pesticides*, (1999) H. Scher, Ed., pp. 31-54.
C. Ramarao et al., *Chem. Commun.*, (2002) 1132 and 1134.
J. Q. Yu et al., *Chem. Commun.*, (2003) 678.
H. Kage et al., *Adv. Powder Technol.*, 13 (2002) 265.
R. Sheldon, *New Developments in Selective Oxidation*, G. Centi and F. Trifiro Ed., pp. 1-32, 1990.

* cited by examiner

*Primary Examiner*—Wayne Langel
*Assistant Examiner*—Brittany M Martinez
(74) *Attorney, Agent, or Firm*—Yuanzhang Han

(57) ABSTRACT

Polymer-encapsulated ion-exchange resins are disclosed. The resins are useful in adsorption, catalysis, and other applications. Catalysts comprising a polymer-encapsulated combination of an ion-exchange resin and a transition metal are also disclosed. The catalysts are useful in hydrogenation, oxidation, hydroformylation, polymerization, and other valuable processes. Certain of the polymer-encapsulated catalysts enhance the productivity in the process for producing hydrogen peroxide from hydrogen and oxygen.

13 Claims, No Drawings

POLYMER-ENCAPSULATED ION-EXCHANGE RESIN

FIELD OF THE INVENTION

The invention relates to a polymer-encapsulated ion-exchange resin and its use as a catalyst or an adsorbent.

BACKGROUND OF THE INVENTION

Hydrogen peroxide is an important intermediate chemical useful in such applications as water treatment, pulp and paper bleaching, and organic synthesis. At present, the commercial process for producing hydrogen peroxide involves anthraquinone autooxidation (see, e.g., U.S. Pat. Nos. 4,428,923 and 6,524,547). The process requires numerous reaction and purification sections, uses a large volume of solvent, and provides a less-than-ideal yield of hydrogen peroxide.

Hydrogen peroxide can also be made by a direct reaction of hydrogen and oxygen in the presence of a suitable catalyst, but so far, low reaction rates, poor selectivities, and potentially explosive reactants have prevented direct $H_2O_2$ manufacture from becoming a commercial reality. Considerable interest remains, however, in identifying safe, economic routes.

Known methods of making hydrogen peroxide from hydrogen and oxygen use supported transition metals (Group 3 to 12 elements), especially platinum group metals. A wide variety of inorganic and organic supports have been identified, including activated carbon (U.S. Pat. Nos. 6,168,775 and 6,649,140), fluorinated carbons (U.S. Pat. No. 5,846,898), sulfonic acid-functionalized carbon (U.S. Pat. No. 6,284,213), silica, alumina (U.S. Pat. No. 5,961,948), polymer fiber (U.S. Pat. No. 6,375,920), and ion-exchange resin (U.S. Appl. Pub. Nos. 2003/0215383 and 2004/0151658).

Recently, a technique called "microencapsulation" was used to prepare catalysts with improved properties (see, e.g., *Chem. Commun*. (2003) 449 and references cited therein; *Angew. Chem., Int. Ed.* 40 (2001) 3469; *J. Am. Chem. Soc.* 120 (1998) 2985). EP 0 498 166 A1 discloses an alumina-supported Pd catalyst impregnated with 4-bromostyrene or styrene that is subsequently polymerized (see Example 7 and Comparative Example 8). Only the poly(4-bromostyrene)-coated catalyst is active in generating hydrogen peroxide from hydrogen and oxygen. U.S. Appl. Pub. No. 2004/0184983 describes a catalyst consisting of: (a) one or more metals of the platinum group as active components; (b) one or more polyolefins; and (c) a carrier. The polyolefin is dissolved in a solvent, and the resulting solution is used to impregnate the carrier or the catalyst. The catalyst is useful in producing hydrogen peroxide from hydrogen and oxygen in a reaction solvent containing a halogenated promoter and/or an acid promoter.

SUMMARY OF THE INVENTION

In one aspect, the invention relates to polymer-encapsulated ion-exchange resins. The resins are useful for adsorption, catalysis, and other applications. The invention also includes catalysts useful for hydrogenation, oxidation, hydroformylation, polymerization, and other valuable processes. The catalysts comprise a polymer-encapsulated combination of a transition metal and an ion-exchange resin. Certain of the polymer-encapsulated catalysts enhance productivity in a process for producing hydrogen peroxide from hydrogen and oxygen.

DETAILED DESCRIPTION OF THE INVENTION

In one aspect, the invention is a composition comprising a polymer-encapsulated ion-exchange resin.

Ion-exchange resins are synthetic organic polymers having ion-exchange properties. Examples of Ion-Exchange resins can be found in *Ion Exchange*, Friedrich Helfferich, McGraw-Hill Book Company, Inc. (1962), pp. 26-71. Most ion-exchange resins are addition copolymers prepared from vinyl monomers. Ion-exchange resins are categorized according to functionality as either strong or weak acids or bases. Acidic resins (cationic resins) generally contain sulfonic acid or carboxylic acid groups. Depending on its application, the acidic ion-exchange resin may contain protons and other cations (e.g., alkali metal, alkaline earth metal, lanthanide metal, zinc, cadmium, ammonium, alkylammonium, alkylphosphonium). Basic resins (anionic resins) generally contain amine, substituted amine, ammonium, or substituted ammonium groups.

Both gelular and macroreticular ion-exchange resins can be used (see, F. Helfferich, supra, at pp. 59-60). Macroreticular ion-exchange resins, which consist of agglomerates of very small gelular microspheres and thus have both micropores and macropores, are particularly preferred. The average pore diameter of the resin is preferably greater than 10 angstroms (Å), more preferably greater than 20 Å. The internal surface area of the resin is in the range of 1-1000 square meters per gram ($m^2/g$), preferably in the range of 10-900 $m^2/g$, more preferably in the range of 30-600 $m^2/g$ (see R. L. Albright, "Basic Principles of Catalysis by Functionalized Porous Organic Polymers," in *Catalyst Supports and Supported Catalysts* (1987), A. B. Stiles, Ed., Butterworths Publishers, pp. 159-186).

The ion-exchange resin of the present invention is polymer-encapsulated. By "encapsulated," we mean that it is contained within and is surrounded by a layer of polymer. Because ion-exchange resins are typically supplied as beads of various sizes (e.g., from about 10 μm to about 2 mm), encapsulation involves entrapping the resin beads within a polymeric coating.

Generally, the polymers are natural or synthetic organic polymers (containing carbon atoms) made by addition or condensation polymerizations. Polymers suitable for use in making polymer-encapsulated catalysts are homopolymers or random and block copolymers produced by free-radical, ionic, coordination, or condensation polymerization of one or more polymerizable monomers. Examples include polystyrenics, polyolefins, polyethers, polyureas, polyacrylics, polyurethanes, polyesters, polyamides, polysiloxanes, polysaccharides, polypeptides, polynucleotides, and the like, and mixtures thereof. Preferred are polystyrenics, polyolefins, and mixtures thereof. Particularly preferred is polystyrene. The polymers can be generated by bulk, solution, suspension, or emulsion polymerization methods. The polymers can be hydrocarbons, or they can incorporate functional groups such as halogens, hydroxyl, amine, ammonium halides, carboxylic acids, phosphine, phosphine oxide, alkoxy, silane, siloxy, or the like. Polymers containing halogens (e.g., poly(4-bromostyrene)) are particularly preferred.

There are many suitable ways to encapsulate an ion-exchange resin within a polymer. Suitable techniques include, for example, spray-drying, spray-chilling, spray-coating, phase separation and coascervation, injection treatment coating, fluid bed coating, dry-on-dry coating, melt extrusion, vapor deposition, in-situ polymerization, including in-situ interfacial polymerization, and the like. These and other microencapsulation techniques are described in the introductory chapter of *Microcapsules and Nanoparticles in Medicine and Pharmacy*, M. Donbrow, Ed., pp. 1-14, and references cited therein, and in G. Beestman, "Microencapsulation of Solid Particles," in *Controlled-Release Delivery Systems for Pesticides* (1999), H. Scher, Ed., pp. 31-54. See also U.S. Pat. No. 6,156,245.

In-situ polymerization is one preferred technique. The ion-exchange resin is suspended in a reaction medium containing monomer(s), an initiator, and other components, and polymerization proceeds to give the polymer-encapsulated ion-exchange resin. The monomers can be hydrophilic (e.g., N,N-dimethylacrylamide), hydrophobic (e.g., styrene), or a combination of these. Suitable techniques include bulk, emulsion, suspension, and interfacial polymerizations. The polymer-encapsulated ion-exchange resin can be prepared in such a manner. As an example, styrene or a mixture of styrene and other ethylenic monomer(s) may be polymerized in an aqueous suspension of an ion-exchange resin.

Polymer encapsulation by phase separation/coascervation is another preferred technique. A suitable approach with polystyrene as the polymer encapsulant is illustrated by Kobayashi et al. (see *Chem. Commun.* (2003) 449 and references cited therein; *Angew. Chem., Int. Ed.* 40 (2001) 3469; *J. Am. Chem. Soc.* 120 (1998) 2985). In a particularly convenient coascervation approach taught by Kobayashi for encapsulating a palladium compound, polystyrene is dissolved in warm cyclohexane. Tetrakis(triphenylphosphine)-palladium(0) is dissolved in the mixture. Upon slow cooling to 0° C., phase separation and capsule formation occur. Hexane is added to harden the microcapsules, which are then isolated, washed, and dried. Similarly, an ion-exchange resin is mixed with a solution of a polymer (e.g., polystyrene, polyisobutylene) in a solvent. Upon cooling to a lower temperature or/and the addition of another solvent to reduce the solubility of the polymer in the solvent mixture, phase separation occurs and a polymer-encapsulated resin is obtained.

One interfacial method is illustrated by Ley et al. (see *Chem. Commun.* (2002) 1132 and 1134; and *Chem. Commun.* (2003) 678) in the preparation of polyurea-encapsulated transition metals. In Ley's example, an organic phase containing polymerizable monomers and the transition metal source is dispersed within an aqueous phase that contains emulsifiers and/or stabilizers. Polymerization occurs at the interface to form microcapsule walls. A polyurea-encapsulated ion-exchange resin of the invention is analogously prepared by substituting an ion-exchange resin for the transition metal source. For another example of in-situ polymerization to generate microcapsules, see *Adv. Powder Technol.* 13 (2002) 265.

Polymer-encapsulated ion-exchange resins may be used in many applications. These uses include the softening and deionization of water, waste treatment, food processing, catalysis, and purification procedures in the chemical and pharmaceutical industries. Polymer-encapsulated ion-exchange resins may be used, e.g., in alcohol dehydration (see, e.g., U.S. Pat. No. 3,256,250), olefin hydration (see, e.g., U.S. Pat. No. 4,352,945), condensation (see, e.g., U.S. Pat. No. 4,428,283), etherification (see, e.g., U.S. Pat. No. 4,731,490), and many other conventional uses for ion-exchange resins. It is believed that polymer encapsulation will improve the activity and/or selectivity of ion-exchange resin catalysts in chemical reactions. Similarly, when the ion-exchange resins are used in adsorption applications, polymer encapsulation should affect the relative diffusion rates of the chemical species to be adsorbed, and thus improve the adsorption capacities and/or selectivities.

In another aspect, the invention is a catalyst comprising a polymer-encapsulated combination of a transition metal and an ion-exchange resin. Suitable transition metals are found in Groups 4 to 11. The first row of these, for example, includes transition metals from Ti to Cu. Preferred transition metals are Re, Fe, Ru, Co, Rh, Ir, Ni, Pd, Pt, Ag, and Au. The selection of the transition metal depends on the reaction which the catalyst is used to catalyze. For example, catalysts containing Rh, Co, Ir, Ni, Pt, Pd, Ru, or Os may be used for hydrogenation reactions (see, e.g., EP 1 469 006, WO 2005014168). Catalysts containing Ti, Zr, V, Ru, Mo, or W may be useful in catalyzing oxidation reactions (see, e.g., *New Developments in Selective Oxidation*, G. Centi and F. Trifiro, Ed., pp. 1-32). Catalysts containing Rh, Co, Ir, Ru, Fe, Ni, Pd, Pt, or Os may be used for hydroformylation reactions (see, e.g., U.S. Pat. No. 5,763,677). Catalysts containing Ti, Zr, V, Ni, Ru, or Os may be used for polymerization reactions (see, e.g., U.S. Pat. Nos. 6,908,876, 6,951,831, and 5,728,785).

The transition metal can be present in any suitable form as long as it is capable of catalyzing the reaction desired. For example, it may be present as the free metal (e.g., Pt or Pd metal), as a mixture of metals (e.g., Pd/Au, Pd/Pt mixture or alloy, or the like), or it may be part of a complex that incorporates the metal or metals and other ligands (e.g., $PtCl_2$, $Pd(NH_3)_4Cl_2$, or tetrakis(triphenylphosphine)palladium(0)).

Similarly, the oxidation state of the transition metal is not critical. Palladium, for instance, may be in an oxidation state anywhere from 0 to +4 or any combination of such oxidation states. To achieve the desired oxidation state or combination of oxidation states, the transition metal compound, after being introduced into the catalyst, may be fully or partially pre-reduced. Satisfactory catalytic performance can, however, be attained without any pre-reduction.

The manner in which the transition metal is incorporated into the catalyst is not particularly critical. For example, the transition metal may be supported on the ion-exchange resin by impregnation, adsorption, ion exchange, precipitation, or the like. The transition metal may be added to the resin before, during, or after polymer encapsulation. In one particular method, the transition metal is added to the ion-exchange resin prior to the encapsulation.

There are no particular restrictions regarding the choice of transition metal compound or complex used as the source of the transition metal. Suitable compounds include the nitrates, sulfates, halides (e.g., chlorides, bromides), carboxylates (e.g., acetate), and amine or phosphine complexes of transition metals (e.g., tetrakis(triphenylphosphine) palladium(0), palladium(II) tetraammine bromide).

The catalyst may contain, in addition to the ion-exchange resin and the transition metal, other support components including carbon, titania, zirconia, niobium oxides, silica, alumina, silica-alumina, titania-silica, zirconia-silica, niobia-silica, and mixtures thereof. For example, a composite of an ion-exchange resin and any of the above components may be used to support the transition metal.

The catalyst may be used in a wide variety of organic reactions, including oxidation, hydrogenation, hydroformylation, and many others. Examples include the oxidations of hydrogen, alkanes (e.g., propane, isobutane, ethylbenzene, cumene), alkenes (e.g., propylene, hexene, allyl chloride), or arenes (e.g., benzene, phenol); the hydroformylation of alkenes (e.g., propylene, allyl alcohol) or epoxides (e.g., ethylene oxide, propylene oxide); and hydrogenations of alkenes, aldehydes, or ketones. One particularly useful reaction is the production of hydrogen peroxide from hydrogen and oxygen. For many of these reactions, polymer encapsulation can improve catalyst activity and/or selectivity and reduce leaching of transition metals, particularly, with liquid reaction mixtures.

In yet another aspect, the invention provides a process for producing hydrogen peroxide ($H_2O_2$-producing process). The process comprises reacting hydrogen and oxygen in a solvent in the presence of a catalyst. The catalyst comprises a polymer-encapsulated combination of a transition metal and an ion-exchange resin as described above. As shown in Table 1 (below), a polymer-encapsulated combination of a transition metal and an ion-exchange resin is more productive for making hydrogen peroxide from hydrogen and oxygen compared with a similar catalyst that is not polymer-encapsulated.

Suitable catalysts for the $H_2O^2$-producing process are described in the previous section. Preferred resins are acidic. Although they may contain other cations (e.g., Na, K, ammonium ions), resins essentially free of other cations are particularly desirable for the $H_2O_2$-producing process. For example, the amount of other cations present in a resin is preferably less than 1 wt. %, more preferably less than 0.1 wt. %, most preferably less than 0.01 wt. % relative to the weight of the resin. One group of resins particularly suitable for the present process are sulfonic acid polystyrene resins, i.e., crosslinked polystyrene containing sulfonic acid functional groups. Divinylbenzene is used as the crosslinking agent. Preferred transition metals are Re, Pd, Pt, Au, Ag, and mixtures thereof. Most preferred is Pd.

Oxygen and hydrogen gases are required for the process. Although any sources of hydrogen and oxygen can be used, molecular oxygen ($O_2$) and molecular hydrogen ($H_2$) are preferred. The molar ratio of hydrogen to oxygen ($H_2$:$O_2$) used is preferably within the range of 1:10 to 10:1. More preferably, the $H_2$:$O_2$ ratio is within the range of 1:2 to 4:1.

In addition to oxygen and hydrogen, an inert gas may be used. Preferably, the inert gas is a noble gas such as helium, neon, or argon. Nitrogen, methane, ethane, propane, and carbon dioxide can also be used. Because it is cheap and readily available, nitrogen is preferred. The inert gas advantageously provides a way to keep the oxygen and hydrogen levels in the reaction mixture outside the explosive limits.

The process is performed in the presence of a solvent. Suitable solvents dilute the gaseous reactants to a level effective to allow them to safely react to form hydrogen peroxide. Suitable solvents include, for example, hydrocarbons (e.g., propane, butane, isobutane, toluene, xylenes), halogenated hydrocarbons (e.g., dichloromethane, chlorobenzene, fluorinated hydrocarbons), nitriles (e.g., acetonitrile), and oxygenated solvents. Preferably, both hydrogen and oxygen have appreciable solubility in the solvent. Oxygenated solvents are preferred. The oxygenated solvent is preferably a liquid under the reaction conditions. Suitable oxygenated solvents are water, oxygen-containing hydrocarbons (alcohols, ethers, esters, ketones, and the like), carbon dioxide, and mixtures thereof. Preferred oxygenated solvents include lower aliphatic alcohols, especially $C_1$-$C_4$ alcohols such as methanol, ethanol, isopropyl alcohol, tert-butyl alcohol, and the like, and mixtures thereof. Fluorinated alcohols can also be used. Particularly preferred oxygenated solvents are water, methanol, carbon dioxide, and mixtures thereof. When carbon dioxide is the sole solvent or a cosolvent, it is preferably a liquid or a supercritical fluid under the reaction conditions.

The process may be performed using a continuous flow, semi-batch, or batch mode. The catalyst may be used in the form of a slurry or fixed bed. It is preferred to operate at a total pressure within the range of 1 to 200 bars. The reaction is performed at a temperature effective to produce the desired amount of hydrogen peroxide, preferably at temperatures within the range of 0° C. to 100° C., more preferably from 20° C. to 60° C.

It may be advantageous to use a hydrogen peroxide stabilizer to minimize hydrogen peroxide decomposition. Suitable stabilizers include inorganic acids, organic acids, salts of the above acids, chelating agents, and the like. Examples of hydrogen peroxide stablizers are nitric acid, sulfuric acid, phosphoric acid, hydrochloric acid, hydrobromic acid, pyrophosphoric acid, aminotri(methylenephosphonic acid), 1-hydroxy-ethylidene-1,1-diphosphonic acid, ethylenediamine-tetra(methylene-phosphonic acid), and their corresponding salts (e.g, sodium, potassium, ammonium salts) of the above. The stabilizer is typically added within the range of 0.1 to 1000, preferably 0.1 to 100, more preferably from 1 to 10, parts per million (ppm) based on the weight of reaction mixture.

The following examples merely illustrate the invention. Those skilled in the art will recognize many variations that are within the spirit of the invention and scope of the claims.

COMPARATIVE EXAMPLE 1

Pd/A36 Catalyst

Amberlyst 36 resin (A36, an acidic resin obtained from Rohm & Haas) (50.5 g) is washed with methanol (100 g) in a beaker under gentle agitation. The methanol is then decanted. The methanol washing step is repeated six times. To a suspension containing the washed A-36 resin and 100 g of methanol, a solution containing 1.708 g of palladium acetate and 70 g of acetone is added with mixing at room temperature. After 30 min, the solid is filtered and washed with 100 g of methanol, then dried in a vacuum oven at 60° C. to constant weight. The dried solid catalyst (Catalyst A) (46.5 g) contains 1.9 wt. % Pd.

EXAMPLE 2

Polystyrene-Encapsulated Pd/A36 Catalyst

Into a 2-oz crown cap bottle containing a solution of 13 g of styrene and 0.15 g of 2,2'-azobis(isobutyronitrile) (AIBN), a solution of 0.15% poly(vinyl alcohol) (PVA) in water (120 g) and 30 g of Catalyst A from Example 1 is charged. After being purged with nitrogen, the bottle is capped and the suspension polymerization is effected by end-over-end agitation in a oil bath at 70° C. for 3 h, followed by another 3 h at 90° C. After cooling to room temperature, the polymer-encapsulated catalyst is filtered, washed twice with deionized water, and dried in a vacuum oven at 60° C. to constant weight. The catalyst obtained (Catalyst B) contains 1.04 wt. % Pd.

EXAMPLE 3

Hydrogen Peroxide Production

The tests are conducted in a 450-mL multi-tube Parr reactor. Five test tubes in the reactor share the same gas phase. Each test tube has a magnetic stirring bar and all bars stir at the same rate. Test tubes 1, 2 and 5 are each charged with 10 mg of Catalyst B. Test tubes 3 and 4 are each charged with 5.6 mg of Catalyst A. The catalyst in each test tube contains 0.1 mg of Pd. After 5.6 g of methanol/water (70/30 by weight) is added to each test tube, the reactor is closed and flushed with nitrogen. After the reactor contents are heated to 30° C., the reactor is charged with hydrogen to 100 psig, and then charged with a mixture of oxygen (4 mol %) in nitrogen to 1400 psig. The reaction mixture in each test tube is stirred magnetically at 30° C. for 1 h before it is cooled to room temperature. The concentration of hydrogen peroxide in each solution is determined by liquid chromatography (LC). Table 1 shows that the process of the present invention employing a polystyrene-encapsulated Pd/A36 catalyst gives higher yield of hydrogen peroxide than a similar process performed with the same amount of Pd on a Pd/A36 catalyst that is not polystyrene-encapulated.

TABLE 1

Hydrogen Peroxide Production

| Test | Catalyst | Catalyst Composition | Hydrogen Peroxide [ppm] |
|---|---|---|---|
| 1 | B | 1.04 wt. % Pd/A36/PS (10 mg) | 1407 |
| 2 | B | 1.04 wt. % Pd/A36/PS (10 mg) | 1154 |
| 3 | A | 1.9 wt. % Pd/A36 (5.6 mg) | 611 |
| 4 | A | 1.9 wt. % Pd/A36 (5.6 mg) | 717 |
| 5 | B | 1.04 wt. % Pd/A36/PS (10 mg) | 1413 |

EXAMPLE 4

Hydrogen Peroxide Production

A 300-mL autoclave equipped with a stirrer and a dip tube (the dip tube is capped with a 5-micron filter) is charged with 300 mg of Catalyst B from Example 2, 6 g of deionized water, and 48 g of methanol. The reaction mixture is charged with 66 psig of hydrogen and then to a total pressure of 1294 psig with a mixture of oxygen (4 mol %) in nitrogen. The reaction mixture is heated at 30° C. for 70 min, and the solution is then filtered through the dip tube into another 300-mL autoclave. The concentration of hydrogen peroxide in the filtered solution is expected to be about 1 wt. %.

EXAMPLE 5

Hydrogen Peroxide Production in the Presence of HBr

The procedure of Example 4 is repeated except that 0.6 g of a 0.063 wt. % aqueous HBr solution is included in the reaction mixture. The concentration of the hydrogen peroxide solution is expected to be about 1.5 wt. %.

We claim:

1. A catalyst comprising a polymer-encapsulated combination of a transition metal and a sulfonic acid polystyrene resin.

2. The catalyst of claim 1 wherein the transition metal is selected from the group consisting of rhenium, iron, ruthenium, cobalt, rhodium, iridium, nickel, palladium, platinum, silver, gold, and mixtures thereof.

3. The catalyst of claim 1 wherein the transition metal is selected from the group consisting of rhenium, palladium, platinum, silver, gold, and mixtures thereof.

4. The catalyst of claim 1 wherein the transition metal is palladium.

5. The catalyst of claim 1 wherein the polymer is selected from the group consisting of polystyrenics, polyolefins, and mixtures thereof.

6. The catalyst of claim 1 wherein the polymer is polystyrene.

7. A process for producing hydrogen peroxide, which comprises reacting hydrogen and oxygen in a solvent in the presence of the catalyst of claim 1.

8. The process of claim 7 wherein the transition metal is selected from the group consisting of rhenium, palladium, platinum, silver, gold, and mixtures thereof.

9. The process of claim 7 wherein the transition metal is palladium.

10. The process of claim 7 wherein the polymer is selected from the group consisting of polystyrenics, polyolefins, and mixtures thereof.

11. The process of claim 7 wherein the catalyst further comprises a support component.

12. The process of claim 7 wherein the solvent is selected from the group consisting of alcohols, ethers, esters, ketones, carbon dioxide, water, and mixtures thereof.

13. The process of claim 7 wherein the reaction is performed in the presence of a hydrogen peroxide stabilizer.

* * * * *